UNITED STATES PATENT OFFICE.

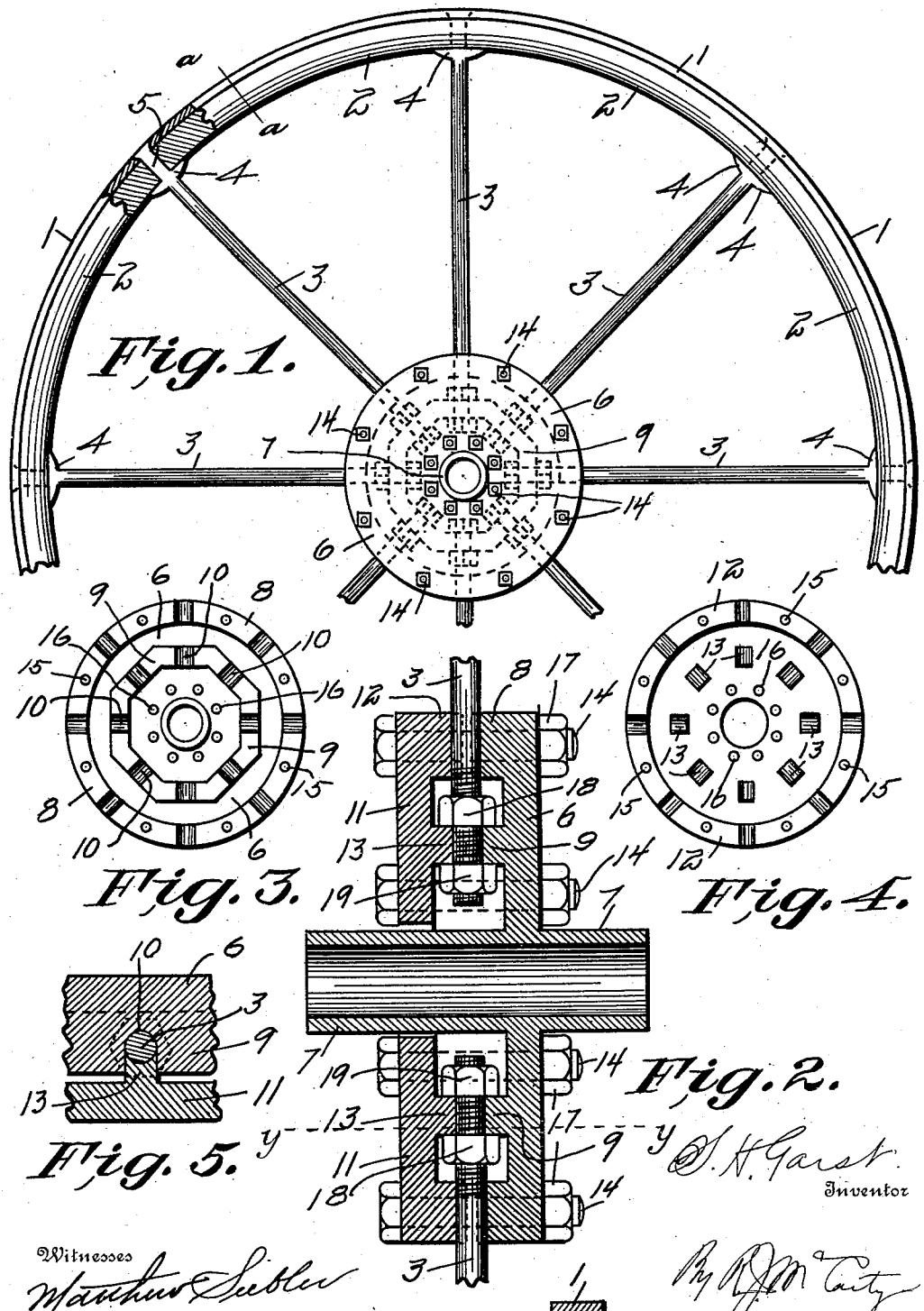

STEPHEN H. GARST, OF MOLINE, ILLINOIS.

VEHICLE-WHEEL.

No. 915,093.  Specification of Letters Patent.  Patented March 16, 1909.

Application filed October 12, 1907. Serial No. 397,037.

*To all whom it may concern:*

Be it known that I, STEPHEN H. GARST, citizen of the United States, residing at Moline, in the county of Rock Island and State of Illinois, have invented certain new and useful Improvements in Vehicle-Wheels; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to new and useful improvements in vehicle wheels more especially with reference to the wheels of agricultural implements.

The object of the invention is to combine desirable features found in all metal wheels and all wooden wheels to the end that the resulting product will be free from the undesirable features found in either of these types of wheels.

All metal wheels or rather wheels constructed entirely of metal, are coming into general use more and more, but such wheels have certain well-defined defects which render them undesirable to some extent; for example, they are too rigid and lack the elasticity common to an all wooden wheel, and there is as a consequence, no cushion to such wheels. The main difficulty with an all iron rim, appears to be that unless the rim or tire is made very heavy (which is undesirable) the spokes will have a tendency to work loose in said rim or tire; and further, the rim or tire, if not very heavy, will have a tendency to flatten between the spokes, and by constant use, the spokes will crystallize at the tire and in time will become weakened and will break. These objections are obviated in the present invention by combining with a metallic wheel, metallic spokes and hub, a wood rim or felly which provides the necessary elasticity to the wheel and prevents the difficulties above indicated. This application of a wooden rim or felly to a metallic tire, cannot be effected by the process that is in common use in the construction of wood wheels; for example, the metal tire in a wood wheel is placed upon the rim or felly after the rim, wood spokes and hub have been united to form the wheel. For example, the process or method of completing the wood wheel and providing it with a metallic tire, is to first put the spokes in the hub, and then connect the rim or felly to the spokes and finally shrink the metallic tire onto the rim or felly.

In the case of a metallic wheel in which the spokes are of soft steel, they will not take the shrinkage of the tire like an elastic or wood spoke. Owing to these exigencies the well-known method or process of the construction of an all metal wheel or an all wood wheel is departed from in the process or method of constructing the present wheel, which as before stated, comprises the union of a wood rim or felly with metallic spokes and hub.

Preceding a further description of the matter, reference is made to the accompanying drawings, of which—

Figure 1, is an elevation of a wheel made in accordance with my invention, a portion of said wheel being broken away to accommodate space. Fig. 2, is an enlarged sectional view of the hub. Fig. 3, is a side elevation of the inner side of the hub proper. Fig. 4, is a similar view of a clamping plate coöperating with the hub and forming a portion thereof when united. Fig. 5, is a sectional view of the hub on the line $y$—$y$ of Fig. 2. Fig. 6, is a section on the line $a$—$a$ of Fig. 1.

In a detail description of the invention, similar reference characters indicate corresponding parts.

In making an ordinary wood wheel the outer end of the spoke terminates in a tenon which fits into a mortise in the felly. Where wood fits into wood as it does in that case, there are a number of ways which are well known and by which this junction can be made a solid joint. In addition to this, the dish in the wood wheel which in bending the spokes sidewise, forms an elastic resistance to the tire that keeps the wheel solid and the joints tight. A wheel with metal spokes cannot be made in this way for the reason that there is no means by which the tenon on the outer end of the spoke can be held in a mortise in a wood felly. The spokes being made of commercial soft steel do not provide a sufficient amount of elasticity to keep the joints between the outer ends of the spokes and the felly tight. As a consequence, such a joint will wear and in time will become loose and render a wheel so constructed of short life. This is doubtless the reason why wheels with metal spokes and wood fellies have not heretofore come into use. My method of constructing the wheel consists first in shrinking the metallic tire 1 on a wood felly 2, the inner surface of said felly being of oval form which is a common feature of fellies of wooden wheels. The metal rim 1 is shrunk onto the wood felly 2 without any support being given the felly, or in other words, before the hub and spokes have been placed in position.

It will be borne in mind, that in placing a metallic tire upon the felly of a wood wheel, the felly and spokes and hub are connected and the operation of applying the metallic rim is the last step in completing the wheel. With the present invention, the application of the metal tire to the wood felly is the first step as before indicated. After the tire and felly have been united to form a composite ring in the manner above indicated, the next step is the formation of a suitable number of holes through the tire and felly equal distances apart for the spokes 3 which are of metal and may be round or oval in cross section or of any other desirable shape. The holes are made through the metallic tire and the wooden rim and are counter-sunk in the tire. The metal spokes 3 are formed with a double shoulder 4 which extends on both sides of a tenon 5 and abuts against the inner side of the wooden rim when the spoke is united to said rim and to the metallic tire. The tenon 5 or the outer end of each of the spokes penetrates the opening or openings in the rim and tire and is flattened in the form of a rivet in the counter-sunk opening in the metallic rim and thus the spokes are made to clamp tightly the metallic tire and the wood rim or felly. The outer ends of the spokes or the tenon portions are made of sufficient length to pass entirely through the wood felly and the metal tire and project far enough beyond the tire to form a rivet as shown so that the ends of the spokes may be sufficiently upset to prevent their coming out or working loose after the riveted ends thereof should become worn by constant usage. After the spokes have been united to the rim and tire as above indicated, the hub may be placed in position and secured to the spokes in several ways. The usual way of securing metal spokes to metal hubs is to cast the hub around the spokes; electrically weld the spokes to the hub in which case the hub is steel; or rivet the spokes into the hub or they may be screwed into the hub. All of these methods of uniting metallic spokes to metallic hubs are more or less objectionable because of the difficulty of having repairs made upon farms or in vicinities where only the village blacksmith is accessible or available.

In forming a union between the spokes and the hub in the present wheel, the hub is clamped to the ends of the spokes and of course this may be done in different ways, and in producing a metallic wheel with a wood rim or felly, I do not wish to be limited to any one particular way of joining the metal spokes to the metal hub. One way, however, which is thought to be meritorious, is shown in the accompanying drawings and consists in constructing the hub in two parts, one part consisting of the main portion 6 which is integrally united to the axle portion 7 and has two series of concentrically-disposed projections 8 and 9 extending from one side thereof provided with semi-cylindrical recesses 10 which receive one side of the inner end of each of the spokes 3. Mating with this portion of the hub is a clamping ring 11 which has two concentric series of projections 12 and 13 which are provided with recessed surfaces similar to those in the projections of the main body portion of the hub and which receive the opposite sides of the inner ends of the spokes. The two members 6 and 11 so constituting the hub are united by means of two series of bolts 14 which penetrate openings 15 and 16 in the two members of the hub and are provided with nuts 17 by means of which the two members of the hub are caused to rigidly clamp the inner ends of the spokes, the surrounding portions of said hub being properly recessed to provide a suitable contact between the engaging portions of the hub members and the ends of the spokes. The ends of the spokes lying within the hub are fitted with two jam nuts 18 19 which are tightened against the upper and lower sides or the inner and outer sides of the clamping projections 9 and 13 and thus the spokes are securely and rigidly maintained in position in the hub and are prevented from having any longitudinal movement at any time. Of course, it will be understood, that the nuts 18 19 are placed in position on the inner ends of the spokes before the clamping member 11 of the hub is united. The third step in the method of constructing the wheel is, therefore, to unite the metallic spokes to the hub. The spokes are drawn tightly by the inner series of nuts 19 and are held by the outer series 18 and the whole side of the hub in which the spokes are inserted is then closed up by the flange or detachable member of the hub.

While I have mentioned some of the advantages attending a metal wheel provided with a wooden rim or felly, further advantages might be set forth in comparing the same with the usual form of all metal wheel, such wheel being provided with a common form of thin flat rim to which the spokes are directly connected, more or less annoyance has always resulted due to the accumulations of soil on the inner surface of the rim. For example, when the all metal wheel passes over soft ground and cuts into the soil below the surface, the edges of the soil will fall inwardly on the inside face of the rim of the wheel. As the wheel turns, the earth thus accumulated, which may be sand or fine loose soil, such for example, as plowed ground, or mud, is carried up on the inside of the wheel and when it reaches a certain height will fall down on the hub and the spokes of the wheel. If it should be mud, the earth just picked up by the wheel will fill up the wheel more or less and add considerable weight thereto. If the wheel should be on a machine, the mud is liable to enter the working parts thereof with more or less resulting damages. If the ground is dry and loose or of a sandy nature and the wheel is on a cultivator, plow or seeding machine, it will carry up sufficient dirt to raise a cloud of dust, more or less of which will enter the working parts of the machine to interfere with the operation thereof and will be more or less annoying to the operator. In order to avoid these annoyances in an all metal wheel, it will be necessary to construct the metal rim or felly of an unusual thickness in order to avoid the inner flat surface which is commonly if not always a feature of a metal rim or felly. With the wood rim or felly the inner face thereof may be more or less rounded or of oval form without materially affecting the weight of the wheel and the dirt or mud will be shed therefrom as in the ordinary wood wheel.

I claim:

The herein-described method of constructing a metal wheel with wood rim or felly, which consists in first shrinking a metallic tire upon a wood rim or felly before the spokes and hub have been united thereto, in connecting the outer ends of metallic spokes to the wood rim or felly and the metallic tire by inserting said ends through openings in the wood rim or felly and the metallic tire and riveting the outer ends of the spokes against the metallic tire, and in finally uniting the inner ends of the metallic spokes to a metallic hub.

In testimony whereof I affix my signature, in presence of two witnesses.

STEPHEN H. GARST.

Witnesses:
  H. BUNGIS,
  SADIE E. GARST.